United States Patent [19]

Eglise

[11] 4,172,222

[45] Oct. 23, 1979

[54] OPTOELECTRIC COIN EDGE TESTING DEVICE

[75] Inventor: David Eglise, Windsor, England

[73] Assignee: Mars, Incorporated, McLean, Va.

[21] Appl. No.: 856,233

[22] Filed: Dec. 1, 1977

[30] Foreign Application Priority Data

Dec. 2, 1976 [GB] United Kingdom ............... 50386/76

[51] Int. Cl.[2] .......................... G06K 7/14; G07D 5/00; G07F 3/02

[52] U.S. Cl. .............................. 250/223 R; 194/97 A; 250/206; 250/224

[58] Field of Search .................... 250/223 R, 224, 206, 250/215, 216; 194/97 R, 97 A; 209/111.7 R; 235/92 CN

[56] References Cited

U.S. PATENT DOCUMENTS

| | | | |
|---|---|---|---|
| 3,586,864 | 6/1971 | Brany et al. | 250/563 |
| 3,921,003 | 11/1975 | Greene | 250/557 |
| 3,978,962 | 9/1976 | Gregory, Jr. | 194/97 A |

*Primary Examiner*—Siegfried H. Grimm
*Attorney, Agent, or Firm*—Davis, Hoxie, Faithfull & Hapgood

[57] ABSTRACT

A coin testing device for discriminating between an acceptable coin and an unacceptable coin of similar diameter but having a different edge characteristic. The device comprises a coin passageway defining a path along which coins pass through the device. A light source positioned to throw light on the edge of a coin as it passes along the coin passageway and a light sensor is positioned to receive light reflected from the edge of an acceptable coin as it moves along the coin passageway. Means are provided for examining a time-dependent quality of the reflected light received by the sensor such as the duration or the number of pulses and for comparing the value of the quality with the value for an acceptable coin.

13 Claims, 3 Drawing Figures

OPTOELECTRIC COIN EDGE TESTING DEVICE

The present invention relates to a coin testing device for examining the physical characteristics of the edge of a coin.

In automatic vending machines there is a problem of discriminating between the coins which the machine is intended to accept and coins of other currencies having similar characteristics. For example there is a specific problem in discriminating between the German 1 Deutschmark coin and the British fivepence piece since their sizes are very similar and they are made of the same material. One important physical difference between the 1 Deutschmark piece and the fivepence piece is that the 1 Deutschmark has smooth albeit slightly figured edge whereas the fivepence piece has a milled edge.

It is the concern of the present invention to provide a coin testing device which can discriminate between coins having different edge characteristics. The invention is particularly concerned to provide a device that can discriminate between a milled and a smooth edge but it is also applicable to discriminate between scalloped and faceted edges and coins with circular edges.

According to the present invention there is provided a coin testing device for discriminating between an acceptable coin and unacceptable coin having a different edge characteristic, comprising a coin passageway defining a path along which coins pass through the device, a light source positioned to throw light on the edge of a coin as it passes along the coin passageway, a light sensor positioned to receive light reflected from the edge of an acceptable coin as it moves along the coin passageway, and means for examining a time-dependent quality of the reflected light received by the sensor and for comparing the value of the quality with the value for an acceptable coin.

A coin with a smooth edge rolling past the light source will reflect light with high intensity towards the light sensor for a short period of time. A coin with a milled edge on the other hand will give a lower intensity reflection but for a longer duration towards the light sensor due to the scattering of the light by the milled edge. Thus the time dependent quality may be the time for which the output signal from the sensor exceeds a certain threshold value. The means for examining the time-dependent quality may therefore comprise a circuit for producing a signal representative of the time for which the signal from the sensor exceeds a certain threshold value and for comparing the value of this signal with a predetermined value for an acceptable coin.

Scalloped or faceted coins will produce different patterns of reflected radiation. For example they may produce two or more pulses of reflected light towards the sensor. In these circumstances the time-dependent quality will be the number of times the output signal from the sensor exceeds a certain threshold value. It will be appreciated that suitable circuits can be designed for counting the number of times the output exceeds the threshold value and thereby discriminate between the reflected radiation from the scalloped or faceted coins and the reflected radiation from smooth or milled edge circular coins. A light source may be a source of visible light or an infra-red light source.

Embodiments of the invention will now be described, by way of example, with reference to the accompanying drawings of which:

Figure 1:
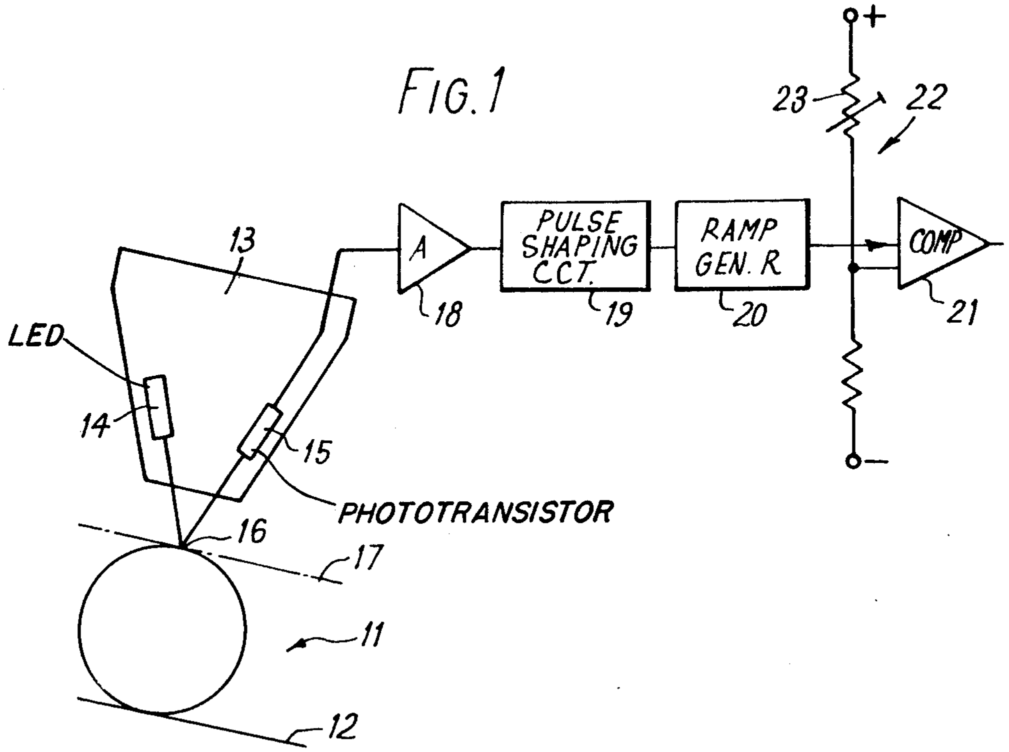
FIG. 1 is a schematic diagram of a first testing apparatus for discriminating between milled and smooth-edged coins.
Figure 2:
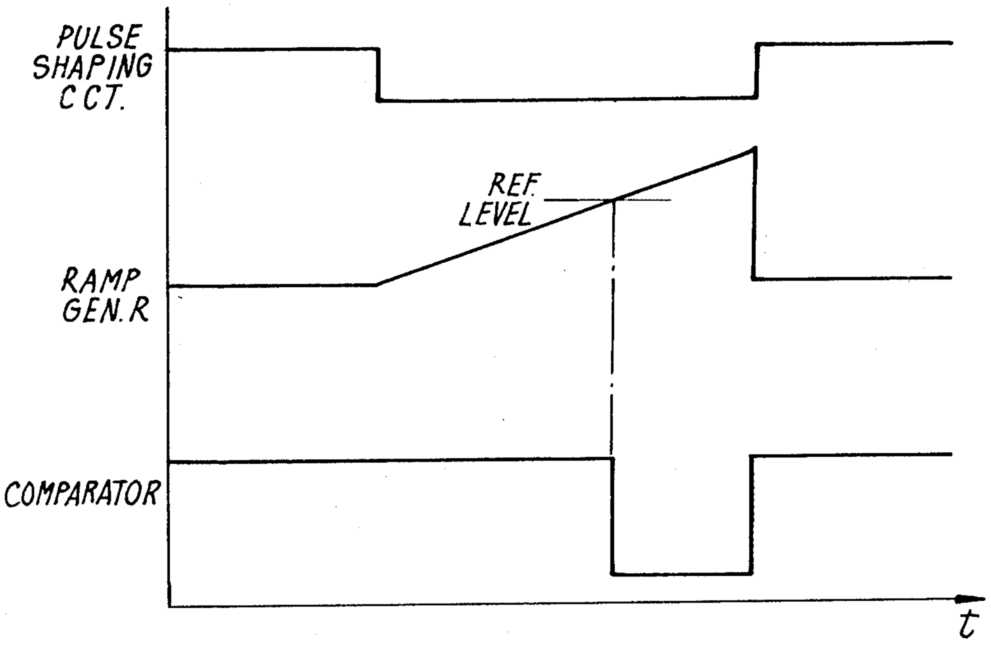
FIG. 2 is a diagram showing the signals from the light sensor, the ramp generator and the voltage comparator of FIG. 1.

Referring to the drawings, a coin testing device for discriminating between milled and smooth edged coins includes a coin passageway 11 formed between two parallel plates (not shown) and having a coin track 12 down which coins roll under gravity. The plates are inclined somewhat from the vertical so that coins rolling down the track 12 bear against one of the plates.

An optoelectronic module 13 is mounted above the coin track 12 and comprises a gallium arsenide infra-red emitting diode 14 which acts as a light source and an npn silicon phototransistor 15 which acts as a light sensor. The output from the phototransistor is fed to circuitry for comparing the duration of an output signal from the phototransistor with a limit value for acceptable or unacceptable coins.

The infra-red emitting diode 14 is fitted with a lens of epoxy resin and is arranged to emit a narrow beam of light and the phototransistor 15 is also fitted with a domed lens of epoxy resin and is arranged to receive light only from a narrow angle. The device and the phototransistor are thus prefocussed and are positioned in the coin passageway so that only infra-red light from the diode 14 that is reflected in the vicinity of the point 16 will fall on the phototransistor 15. The point 16 lies on the line 17 which the top edge of the particular coins to be identified will follow.

The output from the phototransistor 15 is fed to an amplifier 18 and then to a pulse-shaping circuit which has two output levels one of which is ground level. The pulse shaping circuit 19 switches from ground level to the other when the output from the amplifier passes through a certain threshold level and returns to ground level when the output from the amplifier passes back through the threshold level.

The output from the pulse-shaping circuit 19 is fed to a ramp generator 20. When the output from the pulse-shaping circuit 19 is at ground level, the output from the ramp generator is in a passive or "hold state". When the output of the pulse-shaping circuit 19 switches from ground to its other level it causes the ramp generator to start to generate the ramp signal, the magnitude of the output signal from the ramp generator increasing uniformly with time. When the output from the pulse-shaping circuit 19 returns to ground level the output from the ramp generator 20 returns to its hold level. Thus the magnitude of the ramp signal at the end of a sweep will be proportional to the time for which the output of the pulse shaping circuit is at the other level and thus, in turn, on the time for which the output from the amplifier 18 exceeds the certain threshold value.

The output from the ramp generator is fed to one input of a voltage comparator 21, the other input of which is connected to a potential divider 22 with an adjustable resistor 23 so that the reference value can be adjusted. The comparator 21 emits an output when the magnitude of the ramp signal exceeds the reference value set by the potential divider.

When the coin rolling past the optoelectronic module has a smooth edge and its edge lies on the line 17 the coin will give a high intensity reflection toward the phototransistor 15 for a short period of time due to the constant angle of reflection, causing the sensor to emit a large magnitude short duration pulse output. A milled-edge coin gives a lower intensity reflection towards the phototransistor 15 for a longer period of time due to the diffused reflection with multiple angles of reflection, causing the sensor to emit a lower magnitude but longer duration pulse output. Thus by setting the threshold level of the pulse-shaping circuit at a suitable value to register reflections for both milled and smooth edged coins and by setting the reference value of the potential divider at a value which the ramp signal will reach in the time light is reflected from milled edged coins but not in the time light is reflected from smooth edged coins, the device will provide a simple and reliable device for discriminating between milled and smooth edged coins.

Figure 3:
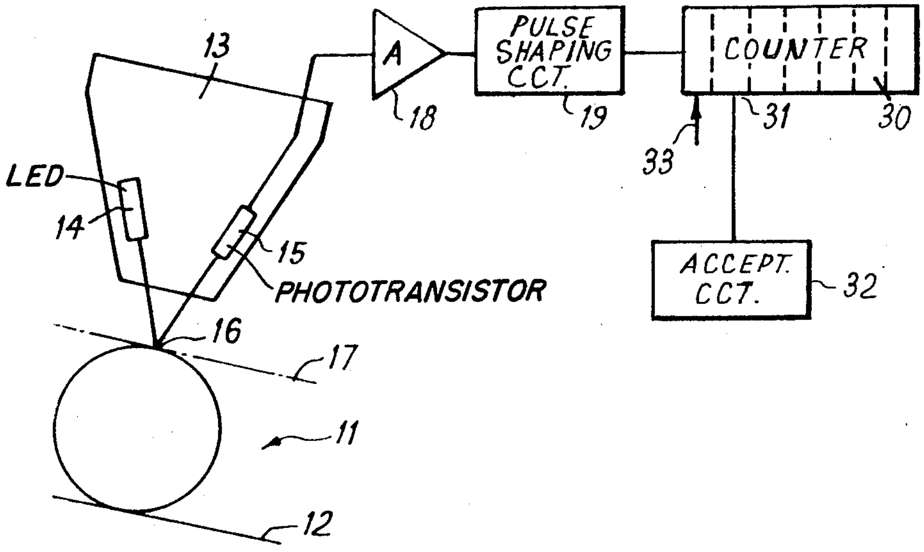
FIG. 3 is a schematic diagram of a second apparatus for discriminating between round and faceted coins.

FIG. 3 shows a modification of the apparatus of FIG. 1 that can be used for discriminating between round coins and faceted coins. The arrangement is similar to that shown in FIG. 1 up to the output of the pulse shaping circuit and therefore the same reference numerals have been used for the corresponding components.

In the apparatus of FIG. 3 the output of the pulse-shaping circuit is fed to a multi-stage counter 30. The acceptance circuit 32 for the apparatus is connected to an appropriate stage of the counter, say the second stage 31. A reset input 33 is provided on the counter for receiving a signal from an arrival sensor (not shown) near the entrance to the coin apparatus for resetting the counter at the beginning of each coin testing operation.

A smooth or milled edge round coin will produce a single pulse as it rolls down the coin passageway 11. A faceted coin such as the British 50 pence coin will produce two or more pulses from the pulse shaping circuit 19 as two or more facets of the coin present themselves in the appropriate attitude to reflect light from the source 14 to the sensor 15 as the coin rolls down the passageway.

The passage of a round coin will therefore only advance the counter to the first stage and no signal will be passed to the acceptance circuit. A faceted coin which produces two or more pulses will advance the counter to the second stage or beyond and a signal will be given to the acceptance circuit to accept the coin.

It will be appreciated that the invention can be incorporated in apparatuses with other coin testing devices such as for example that described in our U.K. Pat. No. 1,397,083.

I claim:

1. A coin testing device for discriminating between an acceptable coin and unacceptable coin having a different edge characteristic, comprising a coin passageway defining a path along which coins pass through the device, a light source positioned to throw light on the edge of a coin as it passes along the coin passageway, a light sensor positioned to receive light reflected from the edge of an acceptable coin as it moves along the coin passageway, and means for examining a time-dependent quality of the reflected light received by the sensor and for comparing the value of the quality with the value for an acceptable coin.

2. A coin testing device according to claim 1 in which the time dependent quality is represented by the time for which the amplitude of the signal from the sensor exceeds a certain threshold value, and the means for examining comprises a circuit for producing a second signal representative of the time for which the signal from the sensor exceeds said threshold value and a circuit for comparing said second signal with a reference signal representative of an acceptable coin.

3. A coin testing device according to claim 2 in which the second signal producing circuit includes a pulse-shaping circuit and a ramp generator connected to generate a ramp starting from the start of an output pulse from the pulse-shaping circuit and terminating at the end of the pulse from the pulse-shaping circuit, and the comparing circuit produces an output signal when the amplitude of the ramp from the ramp generator exceeds a predetermined value.

4. A coin testing device according to claim 2 in which said threshold value is a value such as to register reflected radiation from both milled and smooth edged coins.

5. A coin testing device according to claim 1, in which the light source is arranged to produce a narrow beam of light and the sensor is arranged to receive light only from a narrow angle, the sensor and the light source being positioned so that the sensor receives light from the source reflected from a plane coinciding with the line swept out by the upper edge of a coin passing through the passageway.

6. A coin testing device according to claim 1 in which the time-dependent quality is the number of pulses of reflected light received by the sensor, and the means for examining includes a counter for counting the pulses and for providing an indication when the count reaches a predetermined level.

7. A coin testing device according to claim 3 in which said threshold value is a value such as to register reflected radiation from both milled and smooth edged coins.

8. A coin testing device according to claim 2 in which the light source is arranged to produce a narrow beam of light and the sensor is arranged to receive light only from a narrow angle, the sensor and the light source being positioned so that the sensor receives light from the source reflected from a plane coinciding with the line swept out by the upper edge of a coin passing through the passageway.

9. A coin testing device according to claim 3 in which the light source is arranged to produce a narrow beam of light and the sensor is arranged to receive light only from a narrow angle, the sensor and the light source being positioned so that the sensor receives light from the source reflected from a plane coinciding with the line swept out by the upper edge of a coin passing through the passageway.

10. A coin testing device according to claim 4 in which the light source is arranged to produce a narrow beam of light and the sensor is arranged to receive light only from a narrow angle, the sensor and the light source being positioned so that the sensor receives light from the source reflected from a plane coinciding with the line swept out by the upper edge of a coin passing through the passageway.

11. A coin testing device according to claim 7 in which the light source is arranged to produce a narrow beam of light and the sensor is arranged to receive light only from a narrow angle, the sensor and the light source being positioned so that the sensor receives light from the source reflected from a plane coinciding with the line swept out by the upper edge of a coin passing through the passageway.

12. A coin testing device according to claim 10 in which the time-dependent quality is the number of pulses of reflected light received by the sensor, and the means for examining includes a counter for counting the pulses and for providing an indication when the count reaches a predetermined level.

13. A coin testing device according to claim 11 in which the time-dependent quality is the numbr of pulses of reflected light received by the sensor, and the means for examining includes a counter for counting the pulses and for providing an indication when the count reaches a predetermined level.

* * * * *